United States Patent [19]

Iida

[11] Patent Number: 4,809,228

[45] Date of Patent: Feb. 28, 1989

[54] SEMICONDUCTOR MEMORY DEVICE HAVING CONTROLLABLE REDUNDANT SCHEME

[75] Inventor: Norihiko Iida, Tokyo, Japan

[73] Assignee: NEC Corporation, Tokyo, Japan

[21] Appl. No.: 12,332

[22] Filed: Feb. 9, 1987

[30] Foreign Application Priority Data

Feb. 7, 1986 [JP] Japan .................................. 61-26284

[51] Int. Cl.[4] ............................................... G11C 7/00
[52] U.S. Cl. ..................................... 365/189; 365/230; 365/200
[58] Field of Search ................ 365/189, 200, 230, 233

[56] References Cited

U.S. PATENT DOCUMENTS 4,675,849  6/1987  Kinoshita .......................... 365/230

Primary Examiner—Joseph A. Popek
Attorney, Agent, or Firm—Helfgott & Karas

[57] ABSTRACT

A semiconductor memory device having a controllable majority decision reading scheme is disclosed. The memory is featured in that a number of memory cells to be selected in one access cycle is varied by at least one control signal and a logic state of a read-out signal is determined by data derived from the desired number of memory cell on cells.

10 Claims, 3 Drawing Sheets

| $L_3 L_2 L_1 L_0$ | 7 BIT | 5 BIT | 3 BIT |
|---|---|---|---|
| 0 0 0 0 | A71 | A51 | A32 |
| 0 0 0 1 | A72 | A52 | A34 |
| 0 0 1 0 | A71 | A51 | A33 |
| 0 0 1 1 | A72 | A52 | A35 |
| 0 1 0 0 | A71 | A51 | A32 |
| 0 1 0 1 | A72 | A52 | A34 |
| 0 1 1 0 | A71 | A51 | A33 |
| 0 1 1 1 | A72 | A52 | A35 |
| 1 0 0 0 | A71 | A51 | A32 |
| 1 0 0 1 | A72 | A52 | A34 |
| 1 0 1 0 | A71 |  | A33 |
| 1 0 1 1 | A72 |  | A31 |
| 1 1 0 0 | A71 |  | A35 |
| 1 1 0 1 | A72 |  | A31 |
| 1 1 1 0 |  |  | A31 |
| 1 1 1 1 |  |  |  |

SEMICONDUCTOR MEMORY DEVICE HAVING CONTROLLABLE REDUNDANT SCHEME

BACKGROUND OF THE INVENTION

1. Field of the Invention

The present invention relates to a semiconductor memory device, and more particularly to a semiconductor device having a redundant scheme.

2. Description of the Prior Art

Generally in a non-volatile semiconductor memory device, an avalanche phenomenon is caused by applying an inverse bias voltage across a PN-junction in a semiconductor substrate, high energy carriers generated by the avalanche phenomenon are accumulated in a floating gate, and thereby information is stored. On the other hand, in order to rewrite the information, after the accumulated carriers have been discharged by irradiating ultra-violet rays or the like or by applying an inverse electric field, writing of information is effected. However, while such rewriting of information is repeated many times, characteristics of a memory element would be deteriorated, and poor holding of data would arise.

Also, in a single-transistor type of dynamic (volatile) semiconductor memory device which employs a capacitor as data storage means, there exists a problem of soft errors. Namely, due to the fact that electric charge stored in a capacitor would be reduced by α-rays or the like, data held thereby would be inverted, resulting in malfunctions. In order to prevent such lowering of reliability of held information, counter-measure is taken such that parity bits consisting of 4 bits are added to one bite of information, or that all the bits are stored respectively in a plurality of memory elements and a true value is determined by majority decision technique for the information stored in these plurality of memory elements.

However, in the prior art, in the case of determining a true value by majority decision technique, since each bit is stored in a fixed number of memory elements regardless of times of writing and erasing of information, it has been compelled to determine the above-mentioned fixed number on the assumption of the mode of use in which the times of writing and erasing is the highest, and therefore, there has been a problem that an amount of information that can be stored in a single semiconductor memory device has been limited.

Furthermore, there has been a problem that if times of writing and erasing becomes large, since a probability of generating poor data holding in a memory element becomes high, even though the same data bit is held in a fixed number of memory elements, these occurs a difference in reliability of information depending upon a difference in the times of writing and erasing, resulting in difficulty to deal with the information for processing.

SUMMARY OF THE INVENTION

It is therefore one object of the present invention to provide a semiconductor memory device in which reliability of information is uniform and an amount of storable information can be varied.

The semiconductor memory device according to the present invention is featured in that a number of columns to be selected in one access cycle is varied by at least one control signal and a logic state of an output signal is determined by data derived from the desired number of columns. In other words, the number of memory elements or cells for storing one-bit information is made variable according to the present invention.

According to the present invention, in the case where high reliability is required and a large memory capacity is not necessitated, a relatively large number e.g. three, of memory cells are assigned to store one-bit information, and in the case where a relatively large memory capacity is required and reliability of holding data is not important, a small number e.g. one, of memory cell or cells are assigned to store one-bit information.

According to one aspect of the present invention, there is provided a semiconductor memory device comprising a memory array of a plurality of memory cells arranged in rows and columns, a row selection circuit for selecting one of the rows of the memory array, means for receiving at least one control signal, a column selection circuit responsive to column address signals for selecting a first number of column or columns of the memory array when at least one control signal assumes a first state and selecting a second number of columns of the memory array when at least one control signal assumes a second state different from the first state, the second number being larger than the first number, a data determination circuit coupled to the column selection circuit for generating an output signal having a logic state which is determined by data derived from the first number of column or columns when at least one control signal assumes the first number of column or columns and determined by data derived from the second number of columns when at least one control signal assumes the second state, and output means for outputting the output signal.

DESCRIPTION OF THE PREFERRED EMBODIMENT

Figures 1, 2:
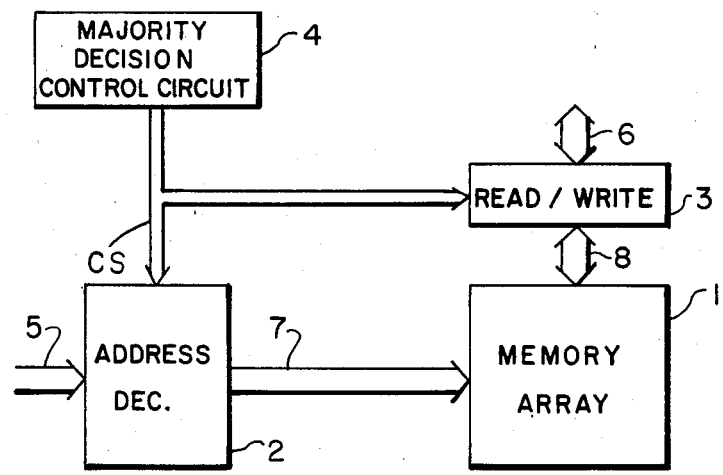
FIG. 1 is a block diagram showing a basic construction of the semiconductor memory device according to the present invention.
FIG. 2 is a table for explaining the mode of majority decision control.

Now the present invention will be described in greater detail with reference to the accompanying drawings. A basic construction of a semiconductor memory device according to the present invention is shown in block form in FIG. 1, in which a non-volatile memory array 1, an address decoder 2, and a read/write buffer circuit 3 including a majority decision circuit are shown as major functional units. A majority decision signal control circuit 4 generates a majority decision control signal CS, and this control signal CS controls the number of memory cells assigned for one-bit information in reading or writing in achieving the majority logic. Majority logic as termed here means that in the case of 3-bit majority decision if two or more bits are the same, in the case of 5-bit majority decision if three or more bits are the same, the value of the majority is output as a true value. The majority decision control signal CS controls, for instance in the case where it is desired to perform 7-bit majority decision, in such manner that 7 memory cells in the memory array 1 may be selected by an output of the address decoder 2 and a true value may be selected according to the 7-bit majority logic from the read/write buffer circuit 3. Now, description will be made on the control for the address decoder 2. FIG. 2 shows relation between 16 outputs and 4-bit inputs $L_0$ to $L_3$ in the decoder 2. In this case, if the outputs of the address decoder 2 are used for 7-bit majority logic addressing, then in the case where the least significant bit $L_0$ (LSB) is, for example, "0", the outputs are grouped as address group A71 in FIG. 2 and this address group A71 in distinction from the case where the LSB is "1" used for identifying another address group A72. Thus two address groups A71 and A72 can be formed. Likewise, in the case of majority logic address consisting of only 5 bits, two address groups A51 and A52 can be formed, as shown. In the case of majority logic address consisting of only 3 bits, on the basis of $L_1$ and $L_0$, 5 address groups A31 to A35 can be formed, as shown in FIG. 2. These majority logic address could be preliminary set in the majority signal control circuit 4 so as to be generated from the circuit 4 as a control signal CS. In the case of FIG. 2, the following decoder outputs can be produced.

$$A71 = \overline{L0} \cdot \overline{L1 \cdot L2 \cdot L3}$$

$$A72 = Lo \cdot \overline{L1 \cdot L2 \cdot L3}$$

$$A51 = \overline{L0} \cdot \overline{L1 \cdot L2 \cdot L3} \cdot \overline{L2 \cdot L3}$$

$$A52 = \overline{L0} \cdot \overline{L1 \cdot L2 \cdot L3} \cdot \overline{L2 \cdot L3}$$

$$A31 = \overline{L0 \cdot L1} \cdot L2 \cdot L3$$

$$A32 = \overline{L0 \cdot L1} \cdot \overline{L2 \cdot L3}$$

$$A33 = \overline{L0 \cdot L1} \cdot \overline{L2 \cdot L3}$$

$$A34 = L0 \cdot \overline{L1} \cdot \overline{L2 \cdot L3}$$

$$A35 = L0 \cdot L1 \cdot \overline{L2 \cdot L3}$$

The above-described address decoder outputs 7 and the 16 decoder outputs issuing a single select output are prepared, and a user of the memory uses these outputs in arbitrary combination. Upon reading, the majority logic circuit within the read/write buffer circuit 3 is controlled by the majority decision control signal CS depending upon the case of 7 bits, the case of 5 bits or the case of 3 bits. In addition, with regard to selection of the addresses upon reading, it is possible to employ either a method of selecting simultaneously in a static manner or a method of selecting in a time-division manner and sequentially inputting the read results to a latch circuit. As a matter of course, it is possible to construct the present system in the same chip as a micro-computer and control it by commands.

Now description will be made on one preferred embodiment of the present invention with reference to FIG. 3.

A memory cell array 11 includes word lines WL0-WLn arranged in rows, three groups of digit lines DA0-DA7, DB0-DB7 and DC0-DC7 arranged in columns, and memory cells MC respectively connected to the respective word lines and the respective digit lines. A row decoder 12 responds to row address signals AR0-ARm for selecting one of the word lines. A column selector circuit 13 receives column decode outputs A0-A7, B0-B7 and C0-C7 from a column decoder 14, and when one output among the column decode outputs, for example, the column output A7 has been selected, a transfer gate TA7 is turned ON to connect the digit line DA7 to a bus line RB. Such row selection and column selection are well known in the art. In the illustrated embodiment, the digit lines, the column decode outputs and the column selection transfer gates are respectively divided into three groups classified by A, B and C. Te bus line RB is connected to a majority decision read circuit 18 via a sense amplifier 17. A group selection decoder 15 responds to 2-bit column address signals AC3 and AC4 and generates their respective complement signals generated by inverters 21 and 22, respectively, and by decoding these signals through NOR gates 23 to 25 it energizes one of group selection decode signals PA, PB and PC. These group decode signals PA, PB and PC are signals for selecting the decode signal groups A0-A7, B0-B7 and C0-C7, respectively.

A bit selection decoder 16 receives three bits of address signals AC0, AC1 and AC2 and energizes one of 8 output lines RD0 to RD7 which are used for selecting one decode signal among each column group A0-A7, B0-B7 or C0-C7. The decoder 16 comprises inverters 47 to 49 and ROMs 50, and it operates when a chip selection signal $\overline{CHP}$ is at a low level. In FIG. 3, illustration is made representatively with respect to two output lines RD0 and RD7 among eight lines. NOR gates 26 to 28 are provided for gating timing signals $M_1$, $M_2$ and $M_3$ to AND gates 29, 31 and 33, respectively, when a reset signal R is at low. The AND gates 29, 31 and 33 transmit the signals $M_1$, $M_2$ and $M_3$, respectively, to NOR gates 35, 36 and 37 when the majority decision control signal CS is at a low level. To the NOR gates 35, 36 and 37 are also input the outputs of AND gates 30, 32 and 34 which receive the group decode signals PA, PB and PC, respectively, the timing signals $M_1$, $M_2$ and $M_3$, respectively, and the control signal CS, jointly with the chip selection signal $\overline{CHP}$ which assumes a low level when the memory is enabled. The output of the NOR gate 35 is input to NOR gates 44-0 to 44-7 in the group A. The output of the NOR gate 37 is input to NOR gates 45-0 to 45-7 in the group B. The output of the NOR gate 37 is input to NOR gates 46-0 to 46-7 in the group C.

Upon single bit operation, the control signal CS takes a high level. Therefore, the AND gates 30, 32 and 34 which receive the signals PA, PB and PC, respectively, are energized in synchronism with the timing signals M3. More particularly, these AND gates 30, 32 and 34 gate the signals PA, PB and PC, respectively, when the timing signals M3 is at a low level. For instance, if the signal PA is at a high level, since the AND gate 30 inputs a low level to the NOR gates 44-0 to 44-7 in the group A when the timing signal M3 is at a low level, among the A-group NOR gates one gate selected by the decoder 16 is activated. Likewise, if the signal PB or PC is at a high level, when the timing signal M3 is at a low level, one of the NOR gates in the group B or C, respectively, is activated by the decoder 16. In this case, during one cycle period in which the timing signals $\overline{M1}$, $\overline{M2}$ and $\overline{M3}$ sequentially take a low level, reading of one bit is achieved.

On the other hand, upon 3-bit majority decision reading, the control signal CS takes a low level. Therefore, the AND gaes 29, 31 and .33 operate so as to gate the timing signals $\overline{M1}$, $\overline{M2}$ and $\overline{M3}$. Consequently, the NOR gates in the group A, in the group B and in the group C are sequentially energized. Hence, at the timing when the signal $\overline{M1}$ is at a low level, one of the digit lines DA0–DA7 is selected. Likewise, at the timing when the signal $\overline{M2}$ is at a low level, one of the digit lines DB0–DB7 is selected, and at the timing when the signal $\overline{M3}$ is at a low level one of the digit lines DC0–DC7 is selected in succession.

The majority decision read circuit 18 includes inverters 38 and 39 having inputs receiving an output of the sense amplifier 17, transfer gates TG1 controlled by a timing signals $\overline{M1}$ having an opposite phases with respect to the timing signal $M_1$, a first latch circuit composed of inverters 56 and 57 enabled in response to a low level of $M_1$, a second latch circuit composed of inverters 58 and 59 enabled in response to a low level of a product signal "M2·CS" generated by an AND gate 40 receiving the signal CS and a timing signal $M_2$ of an opposite phase to $M_2$, a transfer gate TG2 control by the output of the AND gate 40, three AND gates 41 to 43, an OR gate receiving outputs of the AND gates 41 to 43 and a transfer gate TG3 controlled by a timing signal $M_3$ opposite to $M_3$.

When three-bit read-out is performed, the signal CS is set high to allow the gate 40 pass the signal $M_2$. Accordingly, when one-bit read out is achieved and no majority decision is performed, the control signal CS is set at low. Therefore, the output of the AND gate 40 is maintained at low and the gate TG2 is closed. Thus, the level at B is forcebly made high and the AND gate 43 transfer the output of the sense amplifier. Accordingly, the output of the sense amplifier 17 is derived through the OR gate 52 and the transfer gate TG3 when $\overline{M3}$ is at high.

The datum read by the timing signal $\overline{M1}$ is held in the majority decision read circuit 18 by means of the first latch consisting of inverters 56 and 57 in response to $\overline{M1}$. The datum read by the timing signal $\overline{M2}$ is held by means of the second latch consisting of inverters 58 and 59 in response to $\overline{M2}$, and the datum read by the timing signal $\overline{M3}$ is directly input to AND gates 41 and 43.

Consequently, three AND gates 41, 42 and 43 operate to perform majority decision for the read data as shown in the following table, and the result of majority decision is output via the OR gate 52 at the timing of $\overline{M3}$.

| A | B | C | OUT |
|---|---|---|-----|
| 1 | 1 | x | 1 |
| 1 | x | 1 | 1 |
| x | 1 | 1 | 1 |
| 0 | 0 | x | 0 |
| 0 | x | 0 | 0 |
| x | 0 | 0 | 0 | where the mark x denotes either 1 or 0.

Figure 3:
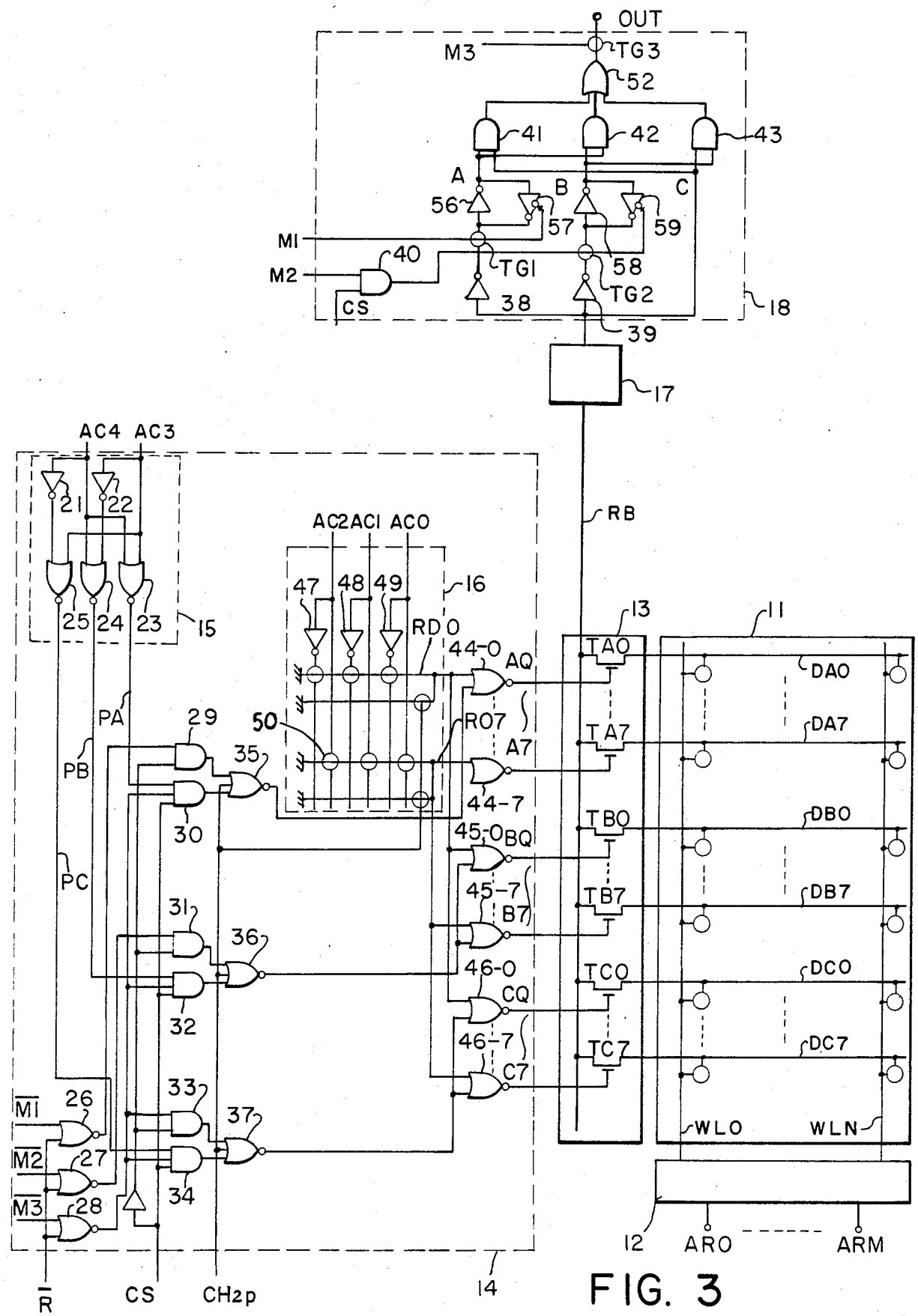
FIG. 3 is a block diagram showing a more detailed construction of one preferred embodiment of the present invention.
Figure 4:
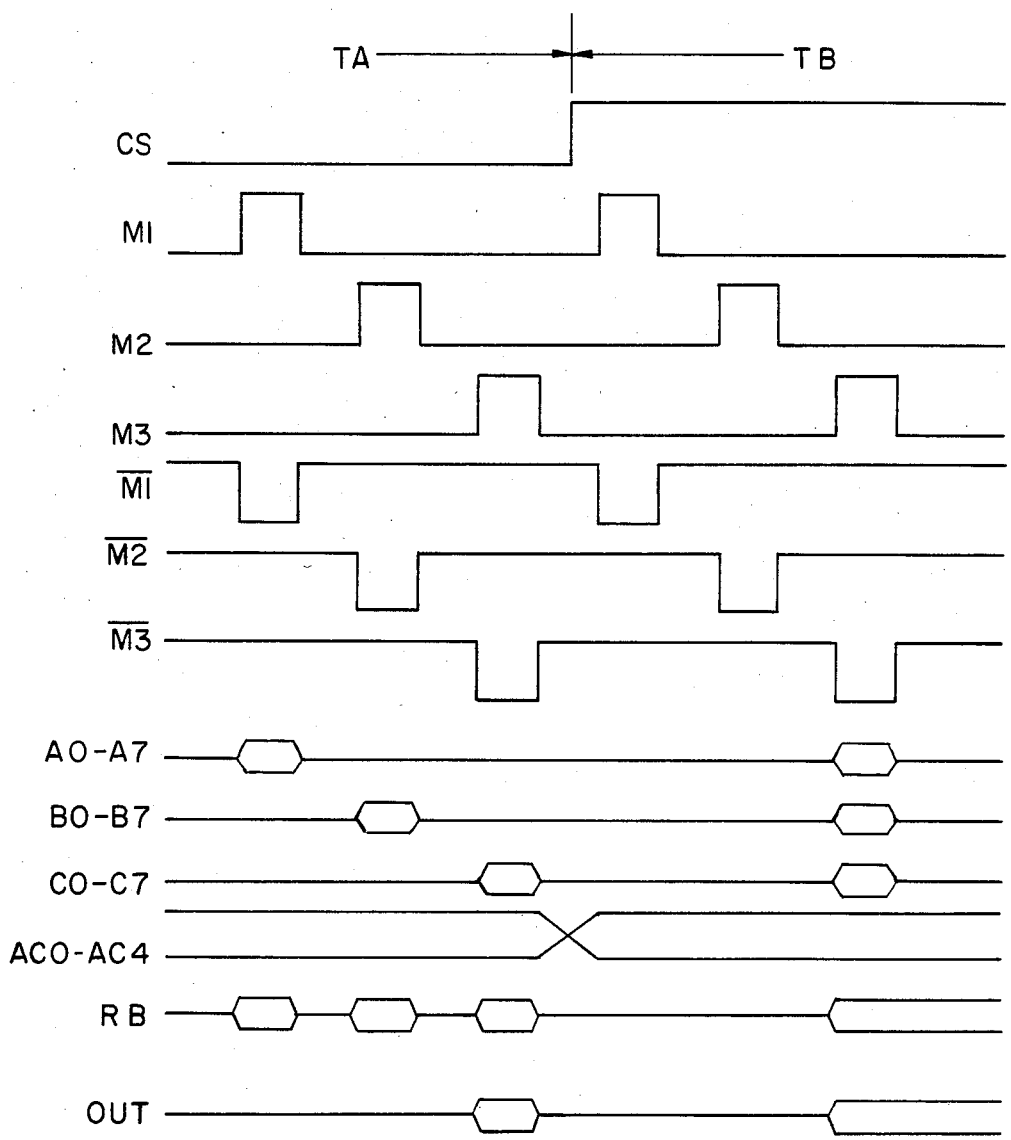
FIG. 4 is a timing diagram showing operations of the memory of FIG. 3.

FIG. 4 shows operations of the memory of FIG. 3.

$T_A$ is a period during which the control signal CS is at a low and the three-bit majority decision reading is achieved. When $M_1$ is at a high level and $\overline{M_1}$ is at a low level, "0" output of the NOR gate 25 is applied to the NOR gates 44-0 to 44-7 which receive the outputs of the decoder 16 and one of outputs A0 to A7 of the NOR gate 44-0 to 44-7 is selected. Accordingly, data on one of the digit lines DA0 to DA7 is transmitted to RB and latched by the first latch (56, 57) in response to $M_1$ via the sense amplifier 17, the inverter 38 and TG1. Then, when $M_2$ is high and $\overline{M_2}$ is low in level, one of the outputs B0 to B7 is selected and data on the one of DB0 to DB7 is read-out to RB and latched by the second latch (58, 59) in the similar way. Subsequently, when $\overline{M_3}$ and $M_3$ are low and high, respectively, one of the outputs C0 to C7 is selected and data on the digit lines DC0 to DC7 is read-out to RB and applied to the nodes A and C. In this instance, three data held at the nodes A, B and C respectively are subjected to the majority decision by the AND gates 41, 42 and 43 and the result is derived through the OR gate 52 and TG3.

$T_B$ is a period during which CS is at a high level and normal one-bit reading is achieved. In this period $T_B$, only when $M_3$ is at a high level and $\overline{M_3}$ is at a low level, one the NAND gates 30, 32 and 34 produce "1" output and designates one of groups A, B and C. Therefore, dependent on the outputs of the decoders 15 and 16, only one of the outputs A0 to A7, B0 to B7 and C0 to C7 is selected and data from the selected digit line is applied to the nodes A and C. In this instance, the node B is at a high level and therefore, the above data is output via TG1.

I claim:

1. A semiconductor memory device comprising a memory array of a plurality of memory cells arranged in rows and columns, a row selection circuit for selecting one of said rows of said memory array, means for receiving at least one control signal representing one of a first state and a second state, a column selection circuit responsive to column address signals and coupled to said receiving means to receive said at least one control signal for selecting a first number of column or columns of said memory array in a first mode and selecting a second number of columns of said memory array in a second mode, said second number being larger than said first number, a control circuit coupled to said receiving means and said column selecting circuit for setting said column selection circuit in said first mode when said at least one control signal assumes the first state and in said second mode when said at least one control signal assumes the second state, a data determination circuit coupled to said column selection circuit for generating an output signal having a logic state which is determined by data derived from said first number of column or columns when said at least one control signal assumes said first state and determined by data derived from said second number of columns when said at least one control signal assumes said second state, and output means coupled to said data determination circuit for outputting said output signal.

2. The memory device according to claim 1, in which columns of said memory array are classified into a plurality of groups of said second number, each of said groups having a third number of columns, and said column selection circuit includes a first column decoder having output terminals of said third number, a second column decoder having output terminals of said second number, and a logic circuit coupled to the output terminals of said first and second column decoders for selecting said first number of column or columns in one of said groups when said at least one control signal assumes said first state and selecting said said first number of column or columns in each of said groups thereby to select said second number of columns as a whole when said at least one control signal assumes said second state.

3. The memory device according to claim 1, in which said data determination circuit includes AND gates receiving said second number for majority decision of data derived from said second number of columns for producing a majority data among said received second number of data.

4. A semiconductor memory device comprising a memory array of memory cells, means for receiving at least one control signal representing a first state or a second state, an addressing circuit coupled to said receiving means to receive said at least one signal for selecting a first number of memory cell or cells when said control signal assumes a first state and selecting a second number of memory cells when said control signal assumes a second state, a data determination circuit coupled to said memory array and said receiving means for determinating a state from a data signal by data of said first number of memory cell or cells when said control signal assumes said first state and by data from said second number of memory cells when said control signal assumes said second state and output means for outputting said data signal.

5. A semiconductor memory device comprising a memory array of memory cells, means for receiving at least one control signal representing a first state or a second state, a first addressing circuit for selecting a first number of memory cell or cells, a second addressing circuit for selecting a second number of memory cells, a first control circuit coupled to said receiving means and said first and second addressing circuits for enabling said first addressing circuit when said at least one control signal is in said first state and enabling said second addressing circuit when said at least one control signal is in said second state different from said first state, a data determination circuit for determinating a state of a majority data signal by data from said first number of memory cell or cells selected by said first addressing circuit in a first mode and by data from said second number of memory cells selected by said second addressing circuit in a second mode, a second control circuit coupled to said receiving means and said data determination circuit for setting said data determination circuit in said first mode when said at least one control signal is in said first state and in said second mode when said at least one control signal is in said second state, and output means coupled to said data determination circuit for outputting said majority data signal.

6. The semiconductor memory device according to claim 5, in which each of said memory cells is a non-volatile type.

7. A semiconductor memory device comprising a plurality of word lines; a plurality of digit lines; a plurality of memory cells coupled to said word lines and said digit lines; means for receiving at least one control signal representing a first state or second state; a row selection circuit for selecting one of said word lines; a data line; a plurality of transfer gates, each of said transfer gates being coupled between said data line and each one of said digital lines, said transfer gates being classified into a plurality of transfer gate groups of a first number, each of said transfer gate groups including a plurality of transfer gates of a second number; a first column decoder having first decoded outputs of said first number, one of said first decoded outputs being selected; a second column decoder having second decoded outputs of said second number, one of said second decoded outputs being selected; a serial selection circuit having serial selection outputs of said first number, said serial selection outputs being sequentially selected one by one; a control selection circuit coupled to said receiving means and having control output terminals of said first number, said control selection circuit outputting said first decoded outputs to said control output terminals when said at least one control signal assumes said first state and outputting said serial selection outputs to said control output terminals when said at least one control signal assumes said second state different from said first state; and a plurality of drive decoder circuits of said first number provided for said transfer gate groups, each of said drive decoder circuits having a first input terminal coupled to one of said control output terminals, a plurality of second input terminals of said second number and a plurality of drive output terminals of said second number, said second input terminals being coupled to said second decoded outputs, said drive output terminals being coupled to the transfer gates of the associated transfer gate group, each of said drive decoder circuits selectively enabling one of the transfer gates of the first input terminal thereof is at a selective level.

8. The semiconductor memory device according to claim 7, in which each of said drive decoder circuits includes a plurality of NOR gates of said first number, each of said NOR gates including a first input node coupled to the first input terminal of the same drive decoder circuit, a second input node coupled to one of the second input terminals of the same drive decoder circuit, and an output node coupled to one of the drive output terminals of the same drive decoder circuit.

9. The semiconductor memory device according to claim 7, in which said control selection circuit including a plurality of first gates of said first number each receiving one of said first decoded outputs, a plurality of said gates of said first number each receiving one of said serial selection outputs, means for enabling said first gates when said at least one control signal assumes said first state, and means for enabling said second gates when said at least one control signal assumes said second state.

10. The semiconductor memory device according to claim 7, in which each of said memory cell is a non-volatile type memory cell.

* * * * *